(12) United States Patent
Cirrincione et al.

(10) Patent No.: US 8,203,654 B2
(45) Date of Patent: Jun. 19, 2012

(54) CONFIGURING TELEVISION BROADCAST SIGNALS

(75) Inventors: Cory Cirrincione, Redmond, WA (US); Joseph McClanahan, Redmond, WA (US); Mark Schwesinger, Bellevue, WA (US); Jessica Zahn, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1222 days.

(21) Appl. No.: 11/956,233

(22) Filed: Dec. 13, 2007

(65) Prior Publication Data
US 2009/0158368 A1 Jun. 18, 2009

(51) Int. Cl.
*H04N 5/50* (2006.01)
(52) U.S. Cl. .......................... 348/731; 348/732
(58) Field of Classification Search .................. 348/725, 348/731, 732
See application file for complete search history.

(56) References Cited

U.S. PATENT DOCUMENTS

| | | | |
|---|---|---|---|
| 5,760,821 A | 6/1998 | Ellis et al. | |
| 5,805,230 A | 9/1998 | Staron | |
| 6,366,326 B1 | 4/2002 | Ozkan et al. | |
| 6,401,242 B1 | 6/2002 | Eyer et al. | |
| 6,483,547 B1 | 11/2002 | Eyer | |
| 6,721,018 B1* | 4/2004 | Shintani et al. | 348/731 |
| 6,981,273 B1 | 12/2005 | Domegan et al. | |
| 7,096,485 B2 | 8/2006 | Voyer et al. | |
| 2002/0095673 A1 | 7/2002 | Leung et al. | |
| 2006/0025092 A1* | 2/2006 | Sanders et al. | 455/161.1 |
| 2007/0143793 A1 | 6/2007 | Barrett et al. | |

OTHER PUBLICATIONS

Many Tuners, Single EPG Source, Different Channels Selection Question http://forums.sagetv.com/forums/showthread.php?t=15861, Feb. 6, 2006.
EPG Design http://wiki.neurostechnology.com/index.php/EPG_Design, Jun. 30, 2007.
Intelligent Signal Analysis and Recognition Using a Self-Organizing Database http://delively.acm.org/10.1145/60000/557331p1116-levinson.pdf?key1=55733&key2=3965645811&coll=GUIDE&dl=GUIDE&CFID=24996828&CFTOKEN=50137238.

* cited by examiner

*Primary Examiner* — Farzana Hossain
(74) *Attorney, Agent, or Firm* — Vierra Magen Marcus & DeNiro LLP

(57) ABSTRACT

A system and methods for configuring a television signal SourceType received by one or more tuners. Each of the tuners in the system are initially identified. The signal type is detected, and based on the signal type, a recorder thread is populated with compatible scanners. A weighted scanning order is established within each recorder thread. In one embodiment, the weighted scanning order is based in part on the region where the tuners receive a signal. Once the recorder threads are established, the tuners are scanned in parallel. Based on the scanning results, the television signal SourceType for each tuner is reported.

18 Claims, 6 Drawing Sheets

CONFIGURING TELEVISION BROADCAST SIGNALS

BACKGROUND

With the advent of an ever increasing number of sources of media, many modern electronic media receivers are capable of tuning media from such multiple sources. For example, some newer televisions and television set-top boxes are capable of receiving terrestrial broadcast, cable and satellite video and audio in multiple formats. Such formats may include broadcast National Television Systems Committee (NTSC) and Phase Alternating Line (PAL) television signals, radio signals, newer high definition Advanced Television Systems Committee (ATSC), Digital Video Broadcasting-Satellite (DVB-S), Digital Video Broadcasting-Terrestrial (DVB-T), Integrated Services Digital Broadcasting (ISDB) television signals, quadrature amplitude modulated (QAM) digital cable signals, and the like.

Many of today's receivers typically include multiple tuners. Each tuner is configured to receive one or more signal types that the receiver is capable of receiving or tuning. The variety of signal types, formats, sources, interconnects, and so on, can be problematic for users who need to configure one or more tuners with respect to their current television (TV) signal source (e.g., cable service, direct broadcast satellite).

Personal computer (PC) users may add tuners, remove tuners, switch tuners, or move tuners to different slots within PCs. Thus, for PCs and other devices that may have a variety of different tuner configurations, the signal/tuner setup experience in these devices can be very complicated for the average PC user. Typical setup questions that may be difficult for an average user to answer during a signal/tuner setup procedure might include, for example, what broadcast standard should be selected (e.g., NTSC, PAL, SECAM, DVB, ATSC), how many tuners should be configured for the selected broadcast standard, what connector type is the TV signal connected to (e.g., RF, Composite Video, S-Video, Component), and how the TV signal is being provided (e.g., an antenna, cable provider, set-top box).

The tuner configuration is not reported until all the tuners have been scanned. This can take a while if the user has, for example, multiple hybrid tuner cards (e.g., a tuner card that may receive a signal through multiple standards) since the program needs to scan every tuner the tuner device supports.

SUMMARY

The technology described herein comprises a system and methods for detecting the source and type of broadcast signal received by each tuner in a tuning device. For example, a Setup Manager coordinates parallel running plug-ins to detect the type of signal each tuner in a personal computer is able to support (e.g., analog or digital) and detect the source of the signal (e.g., cable or antenna).

One aspect of the present technology provides a system and methods to perform an automatic television signal/tuner setup in a tuner device that has one or more tuners. A Setup Manager identifies the number of tuners in the device, whether the tuners are analog or digital, and what broadcast standard each tuner supports. In one embodiment, the geographic region in which the tuner device will be receiving TV signals is identified, and tuners supporting that region are identified. The digital tuners and analog tuners are scanned to locate valid TV signals, and to determine the source of any valid TV signals. After the SourceType of all tuners are determined, a report is provided to a user that summarizes the results of the tuner scanning.

Another aspect of the present invention is to scan each tuner in the system in parallel. In one embodiment, a Setup Manager generates a recorder thread associated with each tuner, populates each recorder thread with compatible plug-ins and organizes the compatible plug-ins in a weighted order within each recorder thread. The Setup Manager may then run each recorder thread in parallel, creating a multithread environment. In an alternative embodiment, the Setup Manager generates a recorder thread associated with each tuner and populates each recorder thread with compatible plug-ins. After all recorder threads have been populated with compatible plug-ins, the Setup Manager organizes the compatible plug-ins in a weighted order within each recorder thread. The Setup Manager may then run each recorder thread in parallel, creating a multithread environment.

Another aspect of the present invention is to organize each plug-in within a recorder thread in a weighted order. Each plug-in within the recorder thread is run in serial. Thus, the second plug-in will not run until the first plug-in is completed its scan, and so on. Running each plug-in has a cost associated with it. For example, scanning for an analog signal costs approximately 1-2 seconds per channel scanned by the plug-in. Scanning for digital signal costs approximately 2-3 seconds per channel scanned by the plug-in. Thus, detecting the source of the signal with the first plug-in is more efficient than in if the signal was detected by the third plug-in within the recorder thread. In one embodiment, the Setup Manager organizes the plug-ins based in part on the geographical region where the tuner device is located.

Another aspect of the present invention is to report the SourceType of each tuner. In one embodiment, the Setup Manager, in a multi-tuner system, does not report the SourceType of each tuner until the SourceType of every tuner within the system has been detected. In an alternative embodiment, the Setup Manager reports the SourceType of each tuner on a rolling basis. Thus, the Setup Manager reports the SourceType of a tuner as soon as a plug-in communicates the Source of the signal to the Setup Manager.

DETAILED DESCRIPTION

Figure 1:
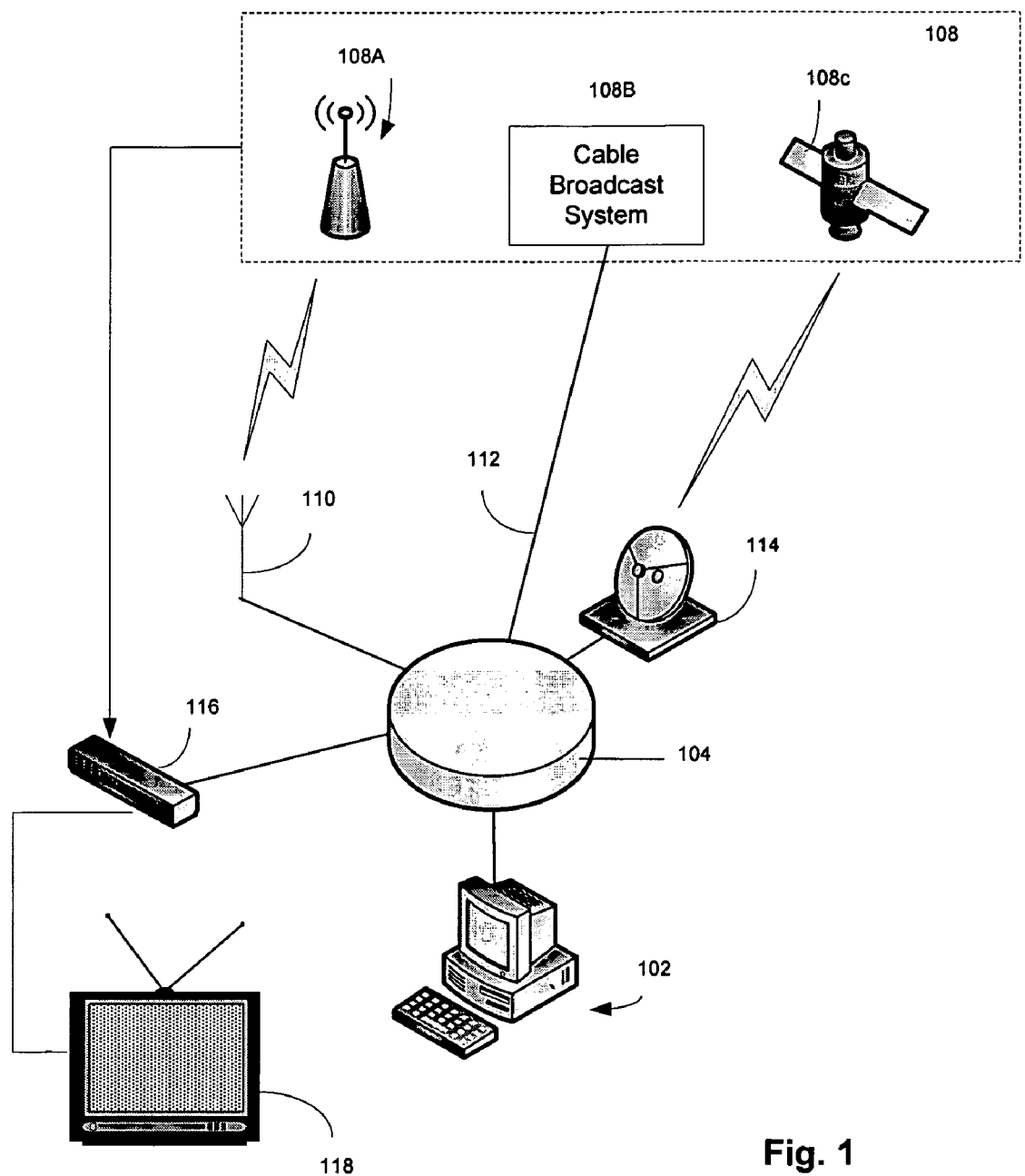
FIG. 1 depicts an exemplary environment suitable for automatically configuring broadcast signals received by one or more tuner in a tuner device.

FIG. 1 illustrates an exemplary environment 100 suitable for automatically setting up TV signals in a tuner device. The environment 100, in this embodiment, includes a PC 102, an antenna 110, a cable system 112, a satellite dish 114, a set-top box 116 and a television 118. Each of these hardware components are connected together by a network 104. The environment 100 also includes a broadcast system 108 (described in more detail later).

In the exemplary environment 100, the tuner device will be referred to as the PC 102. The tuner device may also be implemented as any number of other devices employing one or more tuners configurable in a variety of ways for receiving TV signals. For example, the tuner device may also refer to the set-top box 116, a personal video recorders (PVRs), the television sets 118, and so on. FIG. 1 illustrates that the television set 118 is connected to the set-top box 116. The television set 118 may also be connected to other devices such as, for example, the personal computer (PC) 102, the cable system 112, and so on. For purposes of describing this technology herein, the tuner device will be referred to as the PC 102.

The exemplary environment 100 of FIG. 1 also illustrates the availability of several different TV signal sources 108. A user is most likely to subscribe to or use one or more of these sources 108. These sources include a terrestrial/OTA (over the air) television broadcast system 108a, a cable broadcast system 108b and a satellite broadcast system 108c. The exemplary environment 100 illustrates that these signal sources 108 may be input to PC 102 directly (e.g., through RF antenna 110, cable 112, or satellite dish 114), or they may be input to PC 102 through a network 104 or set-top box (STB) 116.

STB 116 performs the functions of a conventional unit of this nature, such as controlling channel selection and decoding premium broadcast channels. STB 116 may select from different available physical sources 108. Thus, STB 116 may have interfaces that connect to an RF antenna 110 for receiving terrestrial broadcasts, a cable 112 for receiving cable broadcasts, or a satellite dish 114 for receiving satellite broadcasts.

Solely for the purpose of describing the technology herein, suppose the PC 102 has two tuners cards installed. The first tuner card installed in the PC 102 is, by way of example only, a WinTV-PVR-500 MCE card (referred to hereinafter as the "PVR card"). The second card installed in the PC 102, by way of example only, is a WinTV-HVR-1600 card (referred to hereinafter as the "HVR card"). IN this example, both the PVR card 301 and the HVR card 319 are configured for use in the United States. The technology described herein may, of course, work with any number of other tuner cards. The technology described herein may operate with a tuner card configured for use in any country, world-wide.

Figure 3A:
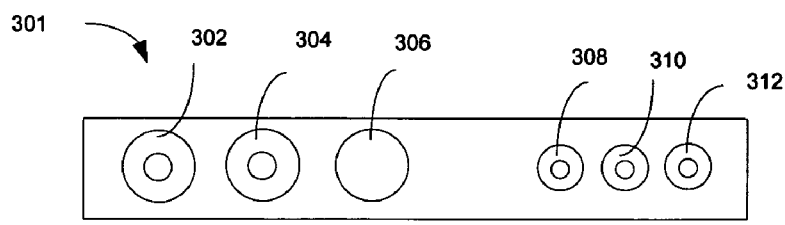
FIGS. 3A-3B depicts schematic diagrams of exemplary tuning devices.

FIG. 3A illustrates that the PVR card 301 includes dual 125 channel cable ready TV tuners. In particular, the PVR card 301 includes a first tuner 302 and a second tuner 304. For the purpose of describing the technology only, the PC 102 operates in the United States. Thus, the first and second tuners 302, 304 will operate as NTSC tuner boards including a coaxial connector that may be connected to a cable source or an antenna source. The PVR card 301 also includes composite inputs 308-312 and a s-video input 316 to connect to a set-top box (either cable or satellite). If the PC 102 were located in Europe, the PVR card 301 would operate as dual PAL/SECAM tuners.

Figure 3B:
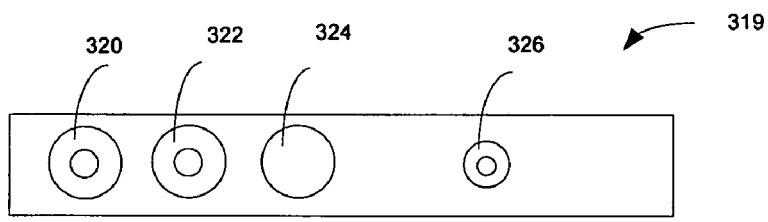

FIG. 3B illustrates that the HVR card 319 includes a single cable ready TV tuner 320 and an ATSC tuner 322. The HVR card 319 also includes an s-video input 324 to connect to a set-top box (either cable or satellite). The HVR card 319 supports an NTSC broadcast and a QAM broadcast through the cable ready TV tuner 320.

Figure 2:
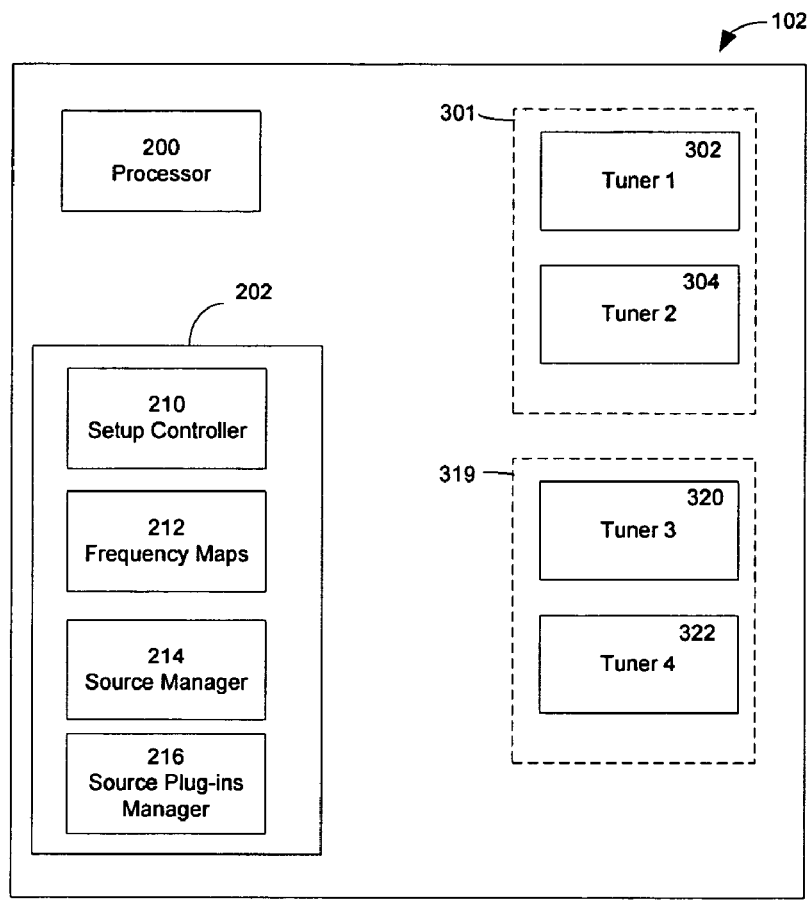
FIG. 2 depicts an exemplary personal computer having a system for configuring broadcast signals received by a tuner.

FIG. 2 illustrates an exemplary embodiment of PC 102, showing various components of PC 102 that facilitate an automatic set up of TV signals with respect to one or more tuners. PC 102 includes logic hardware in the form of one or more processors 200 and associated storage memory 202. Memory 202 includes electronic, randomly accessible memory, and might also include disk-based memory or other similar types of storage. PC 102 also includes the four tuners 302, 304, 320 and 322 described above for receiving TV signals from various TV signal sources 108 such as a terrestrial television broadcast system 108a, a cable broadcast system 108b, and a satellite broadcast system 108c. Processor 200 is connected to, among other tings, communicate with the other interfaces and the tuners.

The exemplary embodiment of PC 102 includes a Setup Controller 210, frequency maps 212, a Source Manager 214 and a Source plug-in Manager 216. The Setup Controller 210 controls an automated setup procedure that analyzes the PC's 102 tuner configuration and input TV signals in accordance with a geographical region in which PC 102 is operating. Among other things, Setup Controller 210 generates a recorder thread for each tuner detected by Source Manager 214, loads the plug-ins from the Source plug-in Manager 216 into each recorder thread, organizes plug-ins in weighted order within each recorder thread, and manages the parallel scanning of all recorder threads. Source Manager 214 identifies the tuner devices in the system, identifies the number of tuners in each tuner device, and filters the appropriate plug-ins based on the type of tuner detected.

In one embodiment, the Source Manager 214 identifies the appropriate geographic region of a tuner by querying the user for geographic identification information such as a zip code or country code. The Source Manager 214 then uses the information received from the user to locate an appropriate frequency map 212 stored in memory 202. A frequency map 212 provides information about what TV signal sources 108 are available in the identified geographic region as well as channel frequencies that are most likely to be in either a cable tuning space or a terrestrial (antenna) tuning space for the identified region. In an alternative embodiment, the Source Manager 214 identifies the geographical region by the unique serial number of the tuner card. In yet another embodiment, the Source Manager 214 identifies the geographical region based on the IP address of the PC 102.

The Source plug-in Manager 216 stores the plug-ins that the Setup Controller 210 may load into a recorder thread. In an alternative embodiment, the available plug-ins are stored in a remote storage location. The plug-ins stored by the Source plug-in Manager 216 may be upgraded and/or replaced. New plug-ins may be added to the Source plug-in Manager 216 to allow the technology described herein to support any broadcast standard that exists today or to support a new broadcast standard that emerges in the future.

Figure 4:
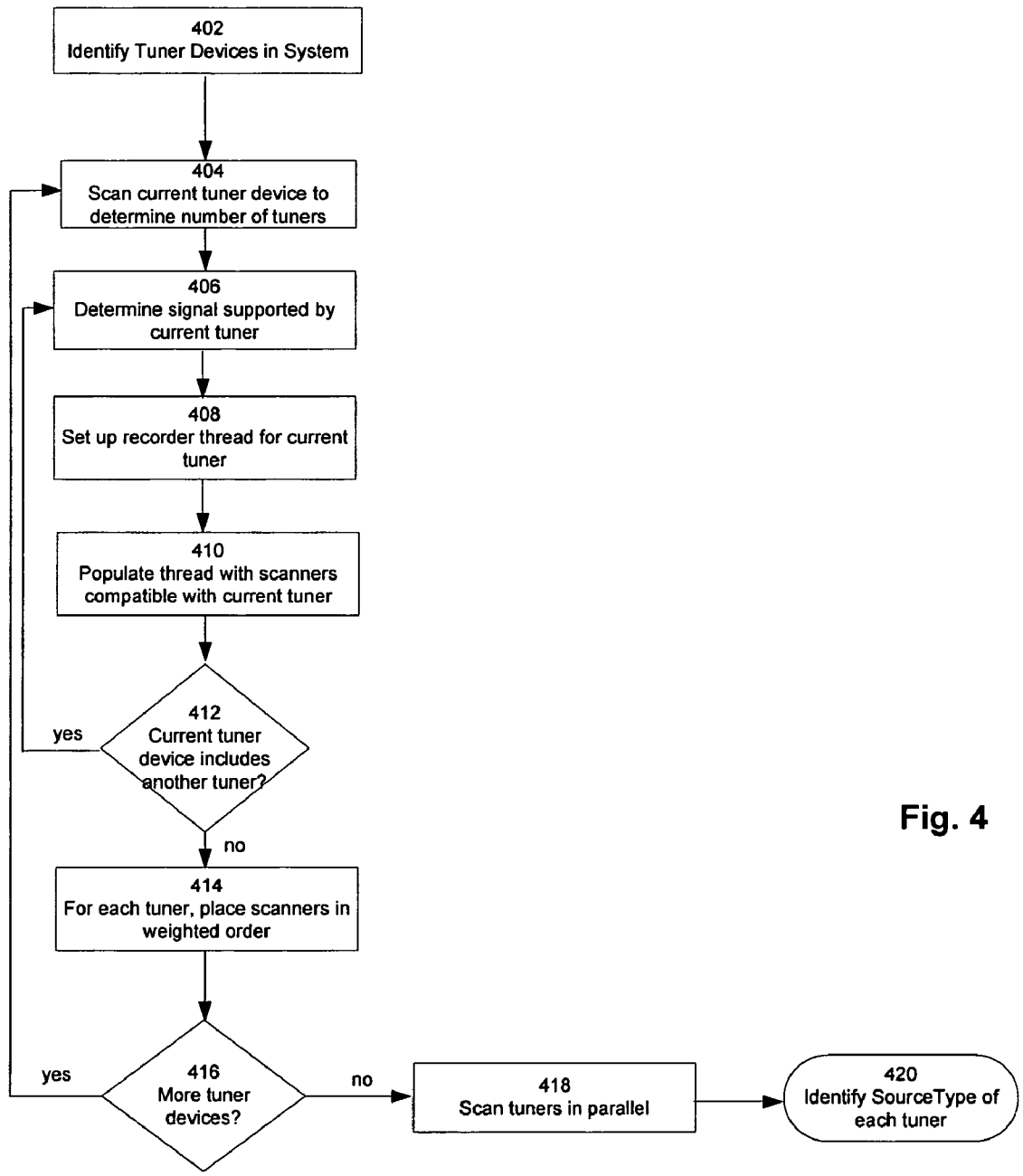
FIG. 4 depicts a flow diagram illustrating exemplary steps for configuring broadcast signals received by a tuner.

FIG. 4 illustrates a flow diagram 400 with exemplary steps for determining the SourceType of each signal received by one of the tuners installed in the PC 102. The SourceType identifies the source of the signal received by the tuner (e.g., cable, antenna, etc.) and the type of the signal (e.g., digital, analog, etc.). In the example system 100 above, the technology described herein will be demonstrated by configuring the SourceType of each signal received by each tuner in the PVR card 301 and the HVR card 319. By way of example only, a signal SourceType that may be identified by the technology described herein may include analog cable, analog antenna, digital cable, digital antenna, set-top box, ATSC cable, ATSC antenna, DVB-S, DVB-T and ISDB.

In step 402, the Source Manager 214 identifies each tuner device located in the PC 102. In the exemplary system 100 described above, the Source Manager 214 identifies that the PVR card 301 and the HVR card 319 have been installed in the PC 102, in step 402. The technology for identifying whether a tuner card is present in the PC 102 is known within the art and therefore, no additional detail is required in this application.

Before each tuner is scanned, the Setup Controller 210 generates a recorder thread for each tuner, retrieves the compatible plug-ins from the Source plug-in Manager 216 and loads the plug-ins into each recorder thread. As discussed above, in step 402, the Source Manager 214 has identified the PVR card 301 and the HVR card 319, and identified the four tuners in step 404. Suppose the Setup Controller 210 begins first by setting up the recorder thread and plug-in loading for the NTSC tuner 302 of the PVR card 301. In step 406, the Source Manager 214 determines the type of signal supported by the first NTSC tuner 302. The Source Manager 214 will determine that the first NTSC tuner 302 supports an analog signal. In step 408, the Setup Controller 210 establishes a recorder thread associated with the first NTSC tuner 302.

In step 410, the Setup Controller 210 populates the recorder thread with scanners (also referred to herein as "plug-ins") that are compatible with the first NTSC tuner 302. In one embodiment, available compatible plug-ins associated with the first NTSC tuner 302 comprise an analog cable scanner, an analog antenna scanner, an analog indeterminate scanner, and an analog set-top box scanner. In one embodiment, the plug-ins are stored in the memory 202. The plug-ins may, of course, also be stored in a remote storage location. The plug-ins may be updated. And new plug-ins may be added to the memory 202 (or remote storage location).

In step 412, the Source Manager 214 determines whether the PVR card 301 includes a second tuner. Because the PVR card 301 includes a second NTSC tuner 304, the Source Manager 214 returns to step 406. In step 406, the Source Manager 214 determines that the second NTSC tuner 304 also supports an analog signal. In step 408, the Setup Controller 210 sets up a second recorder thread, which is associated with the second NTSC tuner 304. The Source Controller 210 populates the second recorder thread with the following compatible scanners, in step 212: analog antenna scanner, analog cable scanner, analog indeterminate scanner, and analog set-top box scanner. In step 412, the Source Manager 214 determines that the PVR card 301 does not contain any additional tuners, and continues to step 414.

The plug-ins are run serially within each recorder thread. Accordingly, the second plug-in within the recorder thread will not run until the first plug-in within the recorder thread has completed its scanning. Running each scanner has a cost associated with it. For example, scanning for an analog signal costs approximately 1-2 seconds per channel scanned by the scanner. Scanning for a digital signal costs approximately 2-3 seconds per channel scanned by the plug-in. Thus, detecting the source of the signal with the first plug-in is more efficient than if the source was not detected until the third plug-in.

Because the plug-ins within each recorder thread are run serially, the plug-ins are organized within each recorder thread in a particular manner for efficient scanning. In step 414, the Setup Controller 210 organizes the plug-ins within each recorder thread in a weighted order. Suppose the Source Manager 214 detects that the PC 102 is located in the United States. In the United States, it is more likely that a television viewer, using the PVR card, will view television via analog cable than via an analog antenna. In addition, an antenna channel may bleed onto t a cable connection if the television is located in an area that is close to a transmitter. Thus, in one embodiment, the Setup Controller 210 places a higher weight to the analog cable scanner than the analog antenna scanner. In one embodiment, the scanners are organized in the following order within the recorder thread for the first NTSC tuner 302: analog cable scanner, analog antenna scanner, analog indeterminate scanner, and analog set-top box scanner. In an alternative embodiment, the Setup Controller 210 organizes the scanners within the recorder thread for the first NTSC tuner 302 as follows: analog antenna scanner, analog cable scanner, analog indeterminate scanner, and analog set-top box scanner. The scanners may be weighted in any order.

In step 416, the Source Manager 214 detects that the PC 102 also includes the HVR card 319 and therefore, returns to step 404. In step 404, the Source Manager 214 detects that the HVR card 319 includes a single TV tuner 320, an ATSC receiver 322 and an s-video input 322. Suppose the Source Manager 214 begins by setting up the TV tuner 320.

In step 406, the Source Manager 214 determines the type of signal supported by the TV tuner 320. The Source Manager 214 will determine that the TV tuner 320 supports an analog and a digital signal. In step 408, the Setup Controller 210 establishes a recorder thread associated with the TV tuner 302.

In step 410, the Setup Controller 210 populates the recorder thread with scanners (also referred to herein as "plug-ins") that are compatible with the TV tuner 320. The available compatible scanners associated with the TV tuner 320 comprise a QAM64/128 scanner, analog cable scanner, an analog antenna scanner, an analog indeterminate scanner, and an analog set-top box scanner. In one embodiment, the plug-ins are stored in the memory 202. The plug-ins may, of course, also be stored in a remote storage location. The plug-ins may be updated. And new plug-ins may be added to the memory 202 (or remote storage location).

In step 412, the Source Manager 214 determines whether the HVR card 319 includes a second tuner. Because the HVR card 319 also includes an ATSC tuner 322, the Source Manager 214 returns to step 406. In step 406, the Source Manager 214 determines that the ATSC tuner 322 supports a digital signal. In step 408, the Setup Controller 210 sets up a second recorder thread, which is associated with the ATSC tuner 322. The Setup Controller 210 populates the second recorder thread with the following compatible scanners, in step 212: ATSC cable scanner and an ATSC antenna scanner. In step 412, the Source Manager 214 determines that the HVR card 319 does not contain any additional tuners, and continues to step 414.

The scanners run serially within each recorder thread. To efficiently detect the signal source, the plug-ins are organized within the recorder thread in a manner such that the first (or one of the first few) plug-in is most likely to detect the signal source. In step 414, the Setup Controller 210 organizes the plug-ins within each recorder thread in a weighted order. In one embodiment, the scanners are organized in the following order within the recorder thread for the TV tuner 320: QAM 64/128 scanner, analog cable scanner, analog antenna scanner, analog indeterminate scanner, and analog set-top box scanner. In an alternative embodiment, the Setup Controller 210 organizes the scanners within the recorder thread for the TV tuner 320 as follows: analog antenna scanner, analog cable scanner, QAM 64/128 scanner, analog indeterminate scanner, and analog set-top box scanner. The scanners may be weighted in any order.

In step 416, the Source Manager 214 determines if the PC 102 contains any additional tuner devices. In the example provided above, the Source Manager 214, in step 416, determines that the PC 102 does not contain any additional tuner devices, and continue to step 418.

The Setup Controller 210 has created a recorder thread for each tuner. Thus, in step 418, all four tuners in the PC 102

(first NTSC tuner 302, second NTSC tuner 304. TV tuner 320 and ATSC tuner 322) may be scanned at the same time (e.g., in parallel).

In step 420, the Setup Controller 210 reports the SourceType associated with each tuner. As discussed above, the Source Manager 214 has previously detected the type of signal (analog or digital). And the plug-ins detect the source of the signal (cable, antenna, satellite). Thus, the Setup Controller 210 is able to report the SourceType as soon as the plug-in detects the signal source. In one embodiment, the Setup Controller 210 does not report the SourceType of each tuner until the Setup Controller 210 detects the source for all tuner have been reported to the Setup Controller 210. In an alternative embodiment, the Setup Controller 210 reports the SourceType of each tuner on a rolling basis. For example, the Setup Controller 210 will report the SourceType associated with the first NTSC tuner 302 as soon as one of the plug-ins detects a signal and reports to the Setup Controller 210. And the Setup Controller 210 will report the SourceType associated with the second NTSC tuner 304 as soon as a plug-in detects a signal source and reports the source to the Setup Controller 210, and so on.

Figure 5:
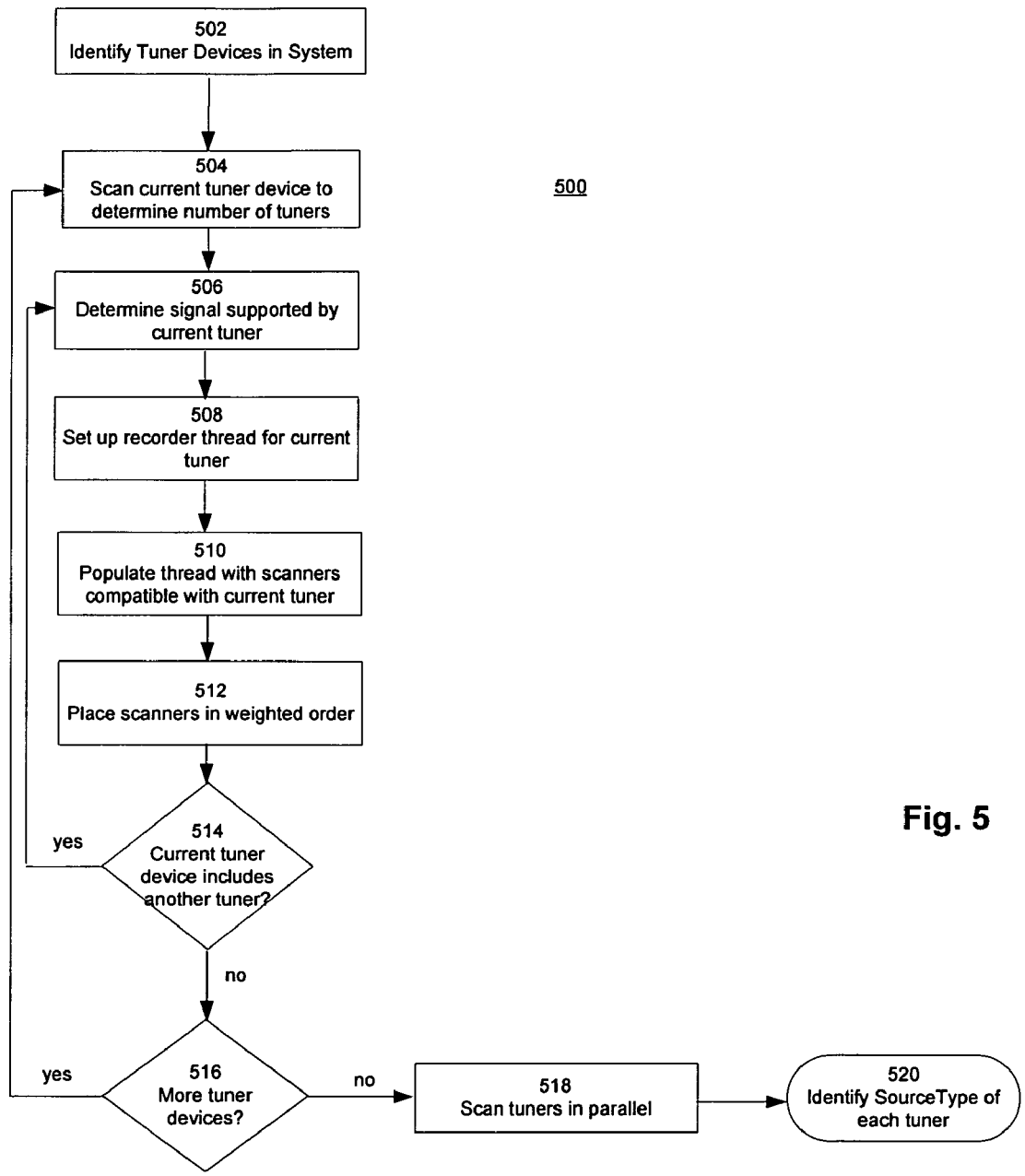
FIG. 5 depicts another flow diagram illustrating exemplary steps for configuring broadcast signals received by a tuner.

FIG. 5 illustrates another flow diagram providing exemplary steps for configuring the signal received a tuner. In this alternative embodiment, the Setup Controller 210 organizes the compatible scanners in a weighted order within each respective recorder thread (step 512) before the Setup Manager 210 determines if the current tuner device contains any additional tuners (step 514). In other words, the Setup Manager 210 organizes the plug-ins within each recorder thread before the Setup Manager 210 continues on to setting up the next tuner.

In step 502, the Source Manager 214 identifies each tuner device located in the PC 102. The Source Manager 214 identifies that the PVR card 301 and the HVR card 319 have been installed in the PC 102, in step 502. Before each tuner may be scanned, the Setup Controller 210 generates a recorder thread for each tuner and loads the compatible plug-ins into the recorder threads (retrieved from the Source plug-in Manager 216). Suppose the Setup Controller 210 begins first by setting up the recorder thread and plug-in loading for the first NTSC tuner 302 of the PVR card 301. In step 506, the Source Manager 214 determines the type of signal supported by the first NTSC tuner 302. The Source Manager 214 determines that the first NTSC tuner 302 supports an analog signal. In step 508, the Setup Controller 210 establishes a recorder thread associated with the first NTSC tuner 302.

In step 510, the Setup Controller 210 populates the recorder thread with the compatible plug-ins associated with the first NTSC tuner 302. In step 512, the Setup Controller 210 organizes the plug-ins within the recorder thread in a weighted order. In one embodiment, the plug-ins are organized in the following order within the recorder thread for the first NTSC tuner 302: analog cable scanner, analog antenna scanner, analog indeterminate scanner, and analog set-top box scanner. In an alternative embodiment, the Setup Controller 210 organizes the scanners within the recorder thread for the first NTSC tuner 302 as follows: analog antenna scanner, analog cable scanner, analog indeterminate scanner, and analog set-top box scanner. The scanners may be weighted in any order.

After the recorder thread has been set up for the first NTSC tuner 302, the Source Manager 214, in step 514, determines whether the PVR card 301 includes a second tuner. Because the PVR card 301 includes a second NTSC tuner 304, the Source Manager 214 returns to step 506. In step 506, the Source Manager 214 determines that the second NTSC tuner 304 also supports an analog signal. In step 508, the Setup Controller 210 sets up a second recorder thread, which is associated with the second NTSC tuner 304. The Setup Controller 210 populates the second recorder thread with the following compatible scanners, in step 212: analog antenna scanner, analog cable scanner, analog indeterminate scanner, and analog set-top box scanner. In step 512, the Setup Controller 210 organizes the plug-ins in a weighted order. In step 514, the Source Manager 214 determines that the PVR card 301 does not contain any additional tuners, and continues to step 516.

In step 516, the Source Manager 214 detects that the PC 102 also includes the HVR card 319 and therefore, returns to step 504. In step 504, the Source Manager 214 detects that the HVR card 319 includes a single TV tuner 320, an ATSC receiver 322 and an s-video input 322. Suppose the Source Manager 214 begins by setting up the TV tuner 320.

In step 506, the Source Manager 214 determines the type of signal supported by the TV tuner 320. The Source Manager 214 determines that the TV tuner 320 supports an analog and a digital signal. In step 508, the Setup Controller 210 establishes a recorder thread associated with the TV tuner 302.

In step 510, the Setup Controller 210 populates the recorder thread with scanners (also referred to herein as "plug-ins") that are compatible with the TV tuner 320. The available compatible scanners associated with the TV tuner 320 comprise a QAM64/128 scanner, analog cable scanner, an analog antenna scanner, an analog indeterminate scanner, and an analog set-top box scanner. In one embodiment, the plug-ins are stored in the memory 202. The plug-ins may, of course, also be stored in a remote storage location. The plug-ins may be updated. And new plug-ins may be added to the memory 202 (or remote storage location).

In step 512, the Setup Controller 210 organizes the plug-ins within each recorder thread in a weighted order. In one embodiment, the scanners are organized in the following order within the recorder thread for the TV tuner 320: QAM 64/128 scanner, analog cable scanner, analog antenna scanner, analog indeterminate scanner, and analog set-top box scanner. In an alternative embodiment, the Setup Controller 210 organizes the scanners within the recorder thread for the TV tuner 320 as follows: analog antenna scanner, analog cable scanner, QAM 64/128 scanner, analog indeterminate scanner, and analog set-top box scanner. The scanners may be weighted in any order.

In step 514, the Source Manager 214 determines whether the HVR card 319 includes a second tuner. Because the HVR card 319 also includes an ATSC tuner 322, the Setup Manager 210 returns to step 506. In step 506, the Source Manager 214 determines that the ATSC tuner 322 supports a digital signal. In step 508, the Setup Controller 210 sets up a second recorder thread, which is associated with the ATSC tuner 322. The Setup Controller 210 populates the second recorder thread with the following compatible scanners, in step 212: ATSC cable scanner and an ATSC antenna scanner. In step 412, the Source Manager 214 determines that the HVR card 319 does not contain any additional tuners, and continues to step 516.

In step 516, the Source Manager 214 determines if the PC 102 contains any additional tuner devices. In the example provided above, the Source Manager 214, in step 516, determines that the PC 102 does not contain any additional tuner devices, and continue to step 518.

The Setup Controller 210 has created a recorder thread for each tuner. Thus, all four tuners in the PC 102, the first NTSC tuner 302, the second NTSC tuner 304, the TV tuner 320 and the ATSC tuner 322, may be scanned at the same time (e.g., in parallel). In step 518, the Setup Controller 210 scans of all four tuners in parallel.

In step 520, the Setup Controller 210 reports the SourceType associated with each tuner. In one embodiment, the Setup Controller 210 does not report the SourceType of each tuner until the Setup Controller 210 receives a source from each of the four recorder threads. In an alternative embodiment, the Setuip Controller 210 reports the SourceType of each tuner on a rolling basis. For example, the Setup Controller 210 will report the SourceType associated with the first NTSC tuner 302 as soon as a plug-in detects a source. And the Setup Controller 210 will report the SourceType associated with the second NTSC tuner 304 as soon as a plug-in detects a source, and so on.

Figure 6:
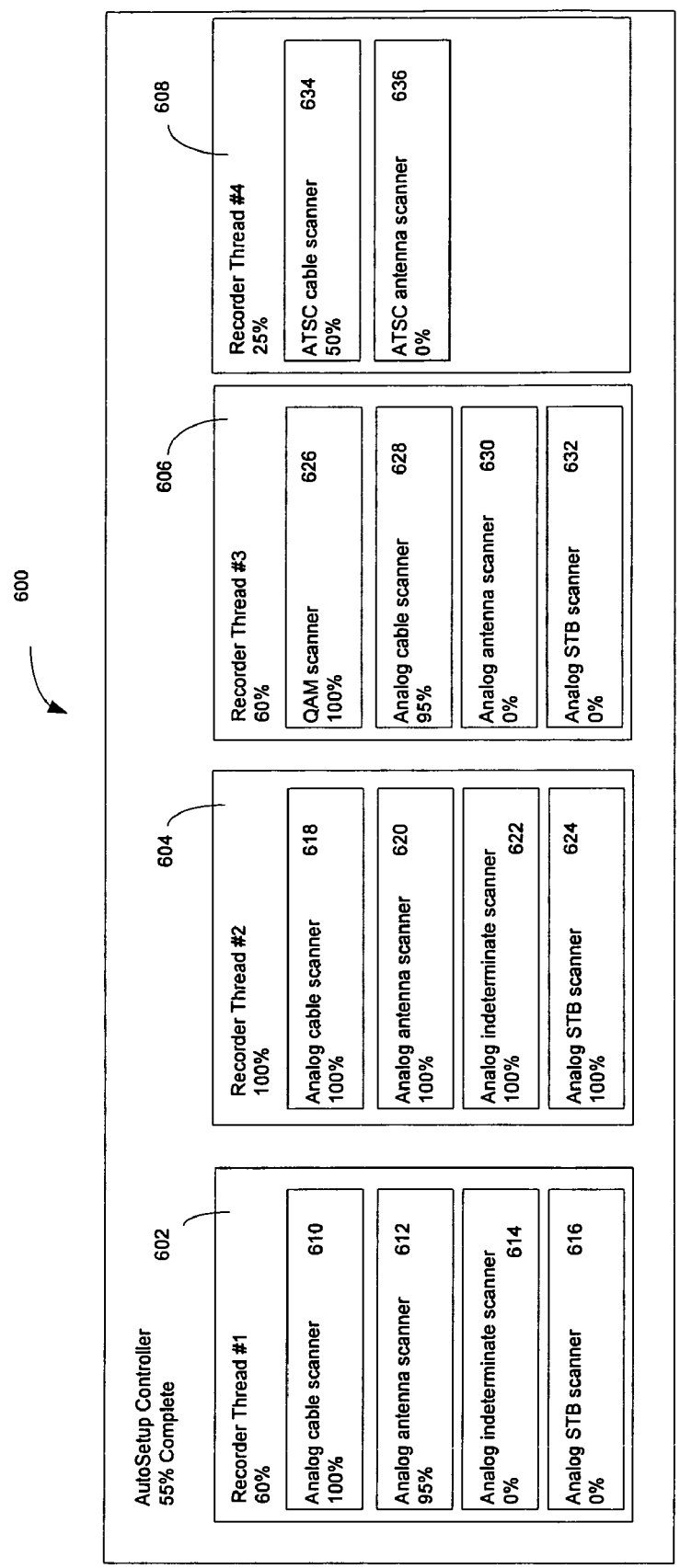
FIG. 6 depicts a schematic drawing illustrating an exemplary recorder thread configuration.

FIG. 6 illustrates an exemplary Setup Controller 600, which in one embodiment, is a plug-in within the Source Manager 214. The Setup Controller 600 is responsible for running automatic setup on all the tuners identified in the PC 102. FIG. 6 illustrates that the Setup Controller 600 manages a recorder thread for each tuner detected in the PVR card 301 and the HVR card 319. In this embodiment, the Setup Controller 600 manages a first recorder thread 602, a second recorder thread 604, a third recorder thread 606 and a fourth recorder thread 608. The first recorder thread 602 is associated with the first NTSC tuner 302. The second recorder thread 604 is associated with the second NTSC tuner 304. The third recorder thread 606 is associated with the TV tuner 320. The fourth recorder thread 608 is associated with the ATSC tuner 322.

The first recorder thread 604 has been populated with an analog cable scanner 610, an analog antenna scanner 612, an analog indeterminate scanner 614 and an analog STB scanner 616. The scanners 610-616 are displayed in the weighted order organized by the Setup Controller 210. The second recorder thread 604 has been populated with an analog cable scanner 618, an analog antenna scanner 620, an analog indeterminate scanner 622 and an analog STB scanner 624. The scanners 618-624 are also displayed in a weighted order determined by the Setup Manager 210. The third recorder thread 606 has been populated with a QAM scanner 626, an analog cable scanner 628, an analog antenna scanner 630 and an analog STB scanner 632. The scanners 626-632 are also displayed in a weighted order determined by the Setup Controller 210. The fourth recorder thread 608 has been populated with an ATSC cable scanner 634 and an ATSC antenna scanner 636. The scanners 634 and 636 are also displayed in a weighted order determined by the Setup Controller 210.

The Setup Controller 600 tracks the scanning progress of each individual scanner, the scanning progress of each recorder thread and the scanning progress of the entire controller itself. For example, the Setup Controller 600 reports that the scanning by the first recorder thread 602 is sixty-percent complete. The completion rate of the first recorder thread 602 is based on the completion rate of each individual plug-in. As shown in FIG. 6, the analog cable scanner 606 has completed its scan of the first NTSC tuner 302. The analog antenna scanner 608 has completed 95% of its scan of the first NTSC tuner 302. And neither the analog indeterminate scanner 610 nor the analog STB scanner 612 have begun to scan the first NTSC tuner 302. As discussed above, in one embodiment, each individual scanner within a recorder thread is run serially. Thus, the analog antenna scanner 608 will not begin to scan the first NTSC tuner 302 until the analog cable scanner 606 has completed its scan.

The Setup Controller 600 is also tracking the progress of each individual plug-in within the second recorder thread 604. For example, the Setup Controller 600 reports that the second recorder thread 604 is finished scanning the second NTSC tuner 304 (e.g., 100%). As shown in FIG. 6, the analog cable scanner 614, the analog antenna scanner 616, the analog indeterminate scanner 618 and the analog STB scanner 620 have each completed its scan of the second NTSC tuner 304 (e.g., each plug-in displays "100%"). The Setup Controller 600 also reports the average scan progress of all the recorder threads. In FIG. 6, the Setup Controller 600 reports that the scanning progress of the entire system (e.g., all four tuners in the PC 102) is 80% complete.

The Setup Controller 600 reports that the third recorder thread 606 is 60% complete. The QAM scanner 626 has completed its scan of the TV tuner 320. The analog cable scanner 708 has completed 95% of its scan of the TV tuner 320. And neither the analog antenna scanner 630 nor the analog STB scanner 632 have begun to scan the TV tuner 320. The controller 700 also reports that the fourth recorder thread 608 is 25% percent complete. The ATSC cable scanner 634 has completed 50% of its scan of the ATSC tuner 322, and the ATSC antenna scanner 636 is waiting to scan the ATSC receiver when the ATSC cable scanner in completed. The Setup Controller 600 also reports the progress of the overall scan completion rate of all the recorder threads. The Setup Controller 600 reports that the scanning progress of the entire system (e.g., all four tuners in the PC 102) is 55% complete.

In one embodiment, the Setup Controller 600 will run each scanner within a recorder thread even though a signal is detected by a scanner prior to reaching the last scanner in the thread. For example, if the analog cable scanner 610 detects a signal on the first NTSC tuner 302, the Setup Controller 600 still allows the additional subsequent scanners within the first recorder thread 602 to scan the NTSC tuner 302. In an alternate embodiment, the Setup Controller 600 cancels additional subsequent scanners if one of the scanners detects a signal. For example, if the analog cable scanner 610 detects a signal on the first NTSC tuner 302, the Setup Controller 600 will cancel the additional subsequent scanners within the first recorder thread 602.

The scanners described herein can generally be divided into two general categories. The scanners are generally either an analog scanner (e.g., analog cable, analog, antenna, etc.) or a digital scanner (e.g., QAM, ATSC, DVB-S, etc.). In general, an analog scanner searches for a channel at a specific frequency while a digital scanner tunes to a digital channel.

Each scanner is configured to identify the television signal source as a cable source or an antenna source. The Source Manager 214 accesses frequency maps 212 based on the geographic region the Source Manager 214 determines the tuner is located. The frequency maps 212 identify a cable tuning space and an antenna tuning space in which the TV signals are expected to be found. After the Source Manager 210 accesses the appropriate frequency map 212, it scans the current tuner to detect valid TV signals within either the cable space or the antenna space at those channel frequencies identified by the frequency map. In one embodiment, to determine if the signal source is a cable source or an antenna source, only a single valid TV signal must be detected in either the cable space or the antenna space.

In an alternative embodiment, to increase the detection accuracy of each scanner, the number of valid TV signals detected in the cable space or the antenna space must exceed a minimum number of channels. For example, a frequency map 212 may include a predetermined number of "most common" TV channels in both a cable space and an antenna space. These TV channels are preferably channels that a plug-in will most likely detect, in any market, if the tuner is connected to a cable source or an antenna source.

Figure 7:
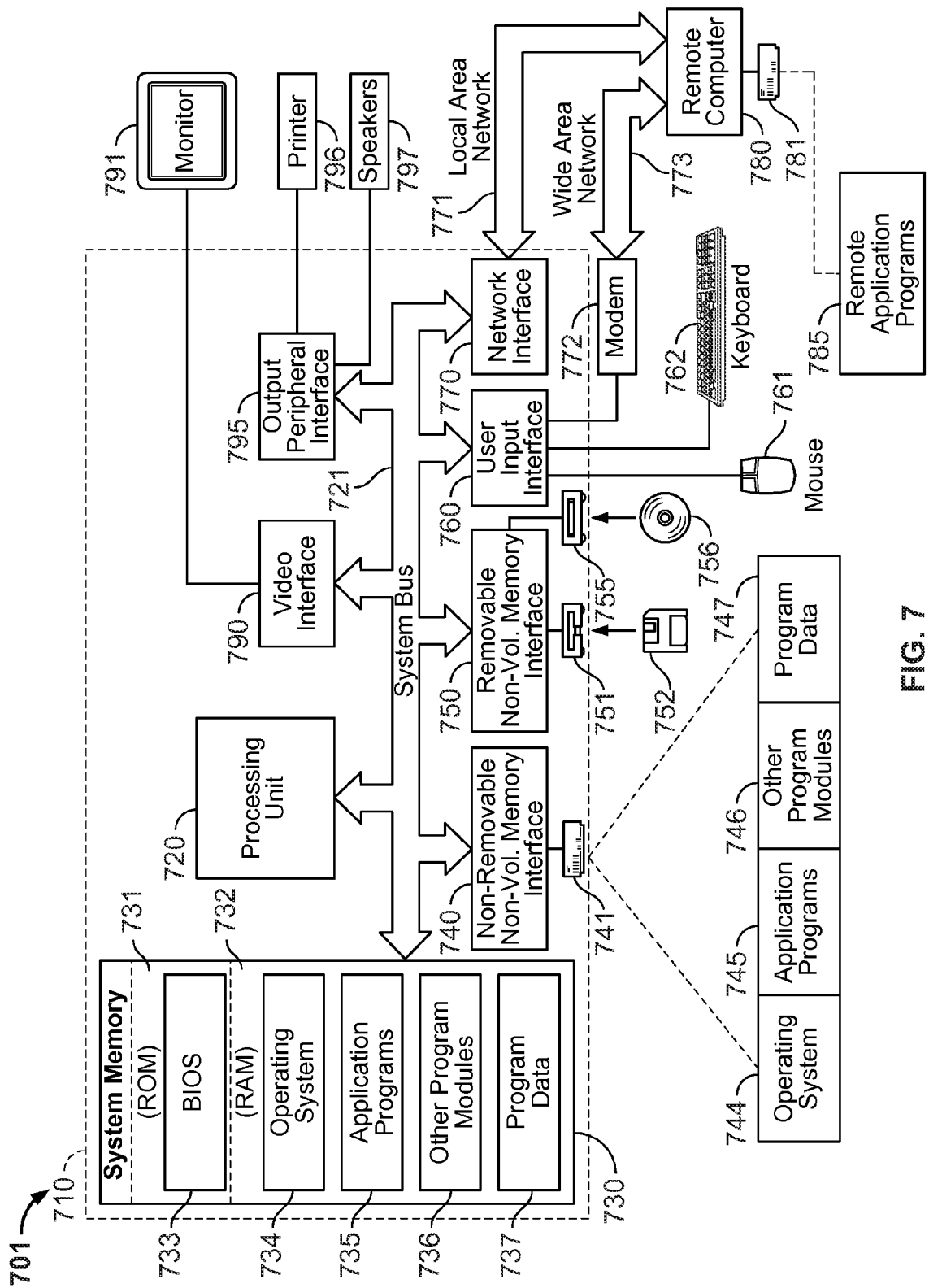
FIG. 7 depicts a block diagram of an exemplary computer system for performing the methods described herein.

FIG. 7 illustrates an example of a suitable general computing system environment 701 for rendering a branded user interface as described above. It is understood that the term "computer" as used herein broadly applies to any digital or computing device or system. The computing system environment 701 is only one example of a suitable computing environment and is not intended to suggest any limitation as to the scope of use or functionality of the inventive system. Neither should the computing system environment 701 be interpreted as having any dependency or requirement relating to any one or combination of components illustrated in the exemplary computing system environment 701.

With reference to FIG. 7, an exemplary system for implementing the inventive system includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 may include a variety of computer readable media. Computer readable media can be any available media that can be accessed by computer 710 and includes both volatile and nonvolatile media, removable and non-removable media. By way of example, and not limitation, computer readable media may comprise computer storage media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 710.

The system memory 730 includes computer storage media in the form of volatile and/or nonvolatile memory such as ROM 731 and RAM 732. A basic input/output system (BIOS) 733, containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 9 illustrates operating system 734, application programs 735, other program modules 736, and program data 737.

The computer 710 may also include other removable/non-removable, volatile/nonvolatile computer storage media. By way of example only, FIG. 7 illustrates a hard disc drive 741 that reads from or writes to non-removable, nonvolatile magnetic media and a magnetic disc drive 751 that reads from or writes to a removable, nonvolatile magnetic disc 752. Computer 710 may further include an optical media reading device 755 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 741 is typically connected to the system bus 721 through a non-removable memory interface such as interface 740. Magnetic disc drive 751 and optical media reading device 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disc drive 741 is illustrated as storing operating system 744, application programs 745, other program modules 746, and program data 747. These components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762 and a pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communication over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781.

It will be appreciated that the network connections shown are exemplary and other means of establishing a communication link between the computers may be used.

The subject matter of the present technology is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. In addition, it is assumed that one skilled in the art is familiar with details pertaining to television signal detection, and so such details are omitted herein for purposes of clarity.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims.

We claim:

1. A method for configuring television signals received by a tuner, comprising:
   (a) identifying each tuner in a tuning device;
   (b) for each tuner identified in step (a), identifying whether the tuner may receive an analog signal or a digital signal;
   (c) creating a recorder thread for each tuner identified in step (a);
   (d) populating each recorder thread with at least one compatible scanner, wherein the at least one compatible scanner is based in part on whether the tuner may receive an analog broadcast signal or a digital broadcast signal, said populating each recorder thread with at least one compatible scanner in step (d) comprises:
   identifying the compatible scanners;
   adding each compatible scanner to the recorder thread; and
   placing the compatible scanners in a weighted order;
   (e) scanning each tuner identified in step (a) in parallel;
   (f) reporting the scanning results.

2. The method as recited in claim 1, wherein identifying each tuner in step (a) comprises:
   identifying the region where the tuner is located; and
   determining the broadcast standard supported the tuner.

3. The method as recited in claim 1, wherein a tuner identified in step (a) receives an analog signal.

4. The method as recited in claim 3, wherein the compatible scanners include:
   an analog cable scanner, an analog antenna scanner, an analog indeterminate scanner, an analog set-top box scanner, an Advanced Television Systems Committee cable scanner and a Advanced Television Systems Committee antenna scanner.

5. The method as recited in claim 4, wherein placing the compatible scanners in a weighted order comprises placing the compatible scanners in the following weighted order within the recorder thread:
   an Advanced Television Systems Committee cable scanner, an analog cable scanner, an Advanced Television Systems Committee antenna scanner, an analog antenna scanner, an analog indeterminate scanner and an analog set-top box scanner.

6. The method as recited in claim 1, wherein the compatible scanners include: an analog cable scanner, an analog antenna scanner, an analog indeterminate scanner and an analog set-top box scanner, a quadrature amplitude modulated scanner, an Advanced Television Systems Committee cable scanner, an Advanced Television Systems Committee antenna scanner, a Digital Video Broadcasting-Terrestrial scanner and a Digital Video Broadcasting-Satellite scanner.

7. The method as recited in claim 1, wherein the compatible scanners within each recorder thread are executed serially based on the weighted order.

8. The method as recited in claim 1, wherein scanning the tuners in step (d) comprises identifying the Source of the signal.

9. The method as recited in claim 1, wherein reporting the scanning results comprises reporting the SourceType of each signal received by a tuner.

10. The method as recited in claim 9, wherein the SourceType associated with a tuner is reported in step (e) as soon as a compatible scanner detects the Source.

11. The method as recited in claim 9, wherein the SourceType associated with a tuner is reported in step (e) only after the Source is detected for each tuner identified in step (a).

12. The method as recited in claim 8, wherein the Source comprises cable, antenna or satellite.

13. The method as recited in claim 1, wherein:
   if a tuner identified in step (a) is located in Europe and it is determined in step (b) that the tuner receives a digital signal, the scanning in step (e) comprises:
   scanning the tuner with a Digital Video Broadcasting-Satellite standard scanner; and
   if a television signal source is not detected by the Digital Video Broadcasting-Satellite standard scanner, scanning the tuner with a Digital Video Broadcasting-Terrestrial standard.

14. The method as recited in claim 1, wherein:
   if a tuner identified in step (a) is located in the United States and it is determined in step (b) that the tuner receives a digital signal, the scanning in step (e) comprises:
   scanning the tuner with a quadrature amplitude modulation scanner;
   if a television signal source is not detected by the Quadrature amplitude modulation scanner, scanning the tuner with an Advanced Television Systems Committee cable scanner;
   if a television signal source is not detected by the Advanced Television Systems Committee cable scanner, scanning the tuner with an Advanced Television Systems Committee antenna scanner; and
   if a television signal source is not detected by the Advanced Television Systems Committee antenna scanner, scanning the tuner with a set-top box scanner.

15. The method as recited in claim 1, wherein:
   if a tuner identified in step (a) is located in the United States and it is determined in step (b) that the tuner receives an analog signal, the scanning in step (e) comprises:
   scanning the tuner with an analog cable scanner;
   if a television signal source is not detected by the analog cable scanner, scanning the tuner with an analog antenna scanner;
   if a television signal source is not detected by the analog antenna scanner, scanning the tuner with an analog indeterminate scanner; and
   if a television signal source is not detected by the analog indeterminate scanner, scanning the tuner with a set-top box scanner.

16. A processor readable memory having processor executable instructions for configuring a signal received by a tuner, comprising: identifying each tuner in a tuning device; creating a recorder thread for each tuner; loading compatible plug-ins into each recorder thread, wherein each compatible plug-in is based on whether the tuner is configured to receive an analog signal or a digital signal, said loading the compatible plug-ins into each recorder thread comprises: identifying compatible plug-ins; loading the compatible plug-ins into each recorder thread; and placing the compatible plug-ins in a weighted order; scanning each of the identified tuners in parallel; reporting the scanning results.

17. The processor-readable medium recited in claim 16, wherein the tuner device is selected from a group consisting of: a tuner card, a set-top box, a television and a personal video recorder.

18. The processor-readable medium recited in claim 16, wherein each compatible plug-in is run serially according to the weighted order.

* * * * *